Dec. 9, 1947.         A. F. SHANER         2,432,342
ROPE RELEASE
Filed Aug. 24, 1944

INVENTOR.
Albert F. Shaner
BY
Victor J. Evans & Co.
ATTORNEYS

Patented Dec. 9, 1947

2,432,342

UNITED STATES PATENT OFFICE 2,432,342

ROPE RELEASE

Albert F. Shaner, Unityville, Pa.

Application August 24, 1944, Serial No. 551,011

1 Claim. (Cl. 24—230.5)

1

This invention relates to a trip rope holder and it is one object of the invention to provide a rope holder adapted to normally hold an end of a trip rope for a tractor plow or similar farm implement, but allow the rope to be released when a quick jerk is exerted upon the rope.

Another object of the invention is to provide a rope holder consisting of a hook having a pivot intermediate its length, one end of the hook being formed with a rope-engaging socket or bill and the other end being weighted so that the hook will be allowed to swing from a rope-securing position to a releasing position and then return to its operative position.

Another object of the invention is to provide a hook which is simple in construction, very efficient in operation, and cheap to manufacture.

The invention is illustrated in the accompanying drawings wherein.

Figure 1:
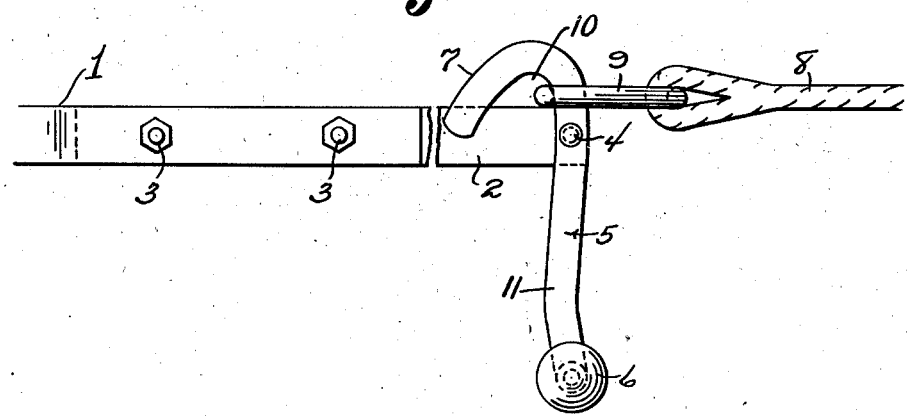
Figure 1 is a side view showing the hook in its operative position.
Figure 2:
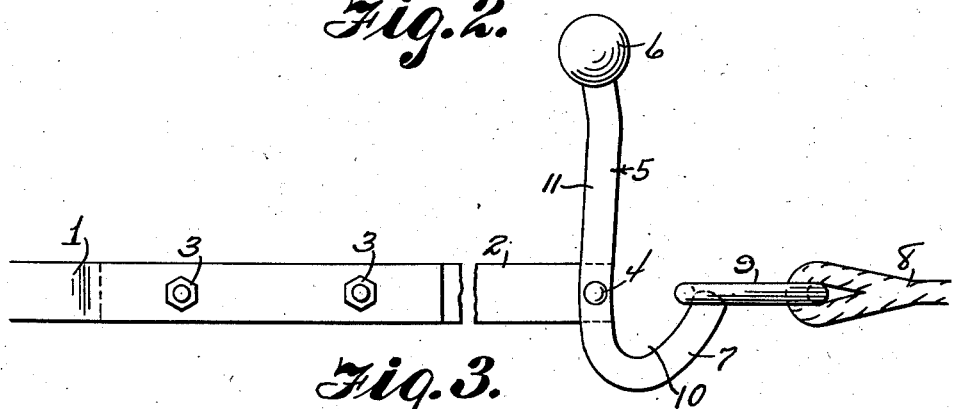
Figure 2 is a side view showing the hook swung to a releasing position.
Figure 3:
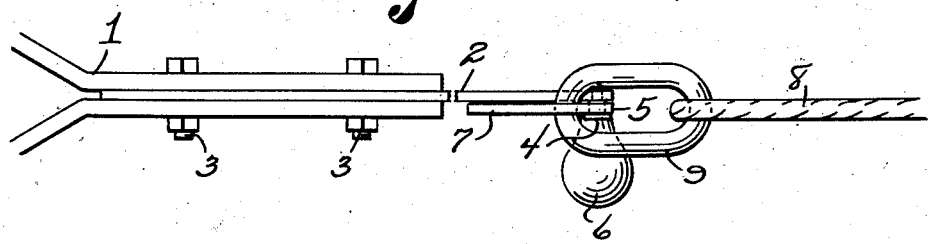
Figure 3 is a top plan view showing the hook in its operative position.

The trip-rope holder constituting the subject matter of this invention may be carried by any convenient portion of a tractor and in the accompanying drawings such a portion of the tractor is indicated in general by the numeral 1, the mounting or first bar 2 of the holder being secured by bolts 3. At its outer end, the bar 2 is formed with a transverse opening to receive a pin 4 which may be a rivet or bolt, and this pin passes through a second bar forming the shank of a hook 5 to pivotally mount the hook for swinging movement from the normal position shown in Figure 1 towards the releasing position shown in Figure 2. The hook is formed of strong metal and is provided with a socket 10 and a straight leg 11 carrying a weight 6 which projects laterally from the side of the hook and constitutes a handle by which the hook may be manually swung to a releasing position as well as serving to yieldably hold the hook in the operative position of Figure 1 with its bill 7 at its upper end and curved downwardly so that its free end overlaps a side face of the mounting or first bar 2. By mounting the weight at one side of the hook, it will be in such position that the hook may be swung to the releasing position without the weight striking the bar and limiting swinging movement of the hook. Therefore, the hook may swing in a complete circle when moved towards a releasing position and return to the operative position.

When the rope holder is in use, it is mounted as shown with the first bar 2 projecting from the portion of the tractor to which it is secured. Normally, the hook 5 is disposed vertically with the straight leg downward and the socket 10 at its upper end and when the cable 8 is to be connected with the hook, the weight or handle 6 is grasped and the hook swung to a position allowing its bill to be engaged through the link or ring 9 carried by the rope. The handle is then released and its weight causes the hook to return to its operative position in which the weight is at its lower end. The weight normally retains the hook in the operative position and holds the rope in engagement with the hook. When, however, a plow or other agricultural implement strikes a rock or other obstruction, a sudden jerk will be imparted to the rope and the hook will be swung about its pivot to the releasing position and the ring 9 will slip out of engagement with the hook. By grasping the rope and exerting a strong jerking pull upon the same, the operator of the tractor may manually swing the hook to the releasing position. A slight steady pull exerted upon the rope will tend to swing the hook towards the releasing position, but not to such an extent that the ring will be released, and therefore the operator of a tractor may pull upon the rope to shift plow blades upwardly for passing over a rock without detaching the rope from the hook and then release the rope to allow the plow blades to return to a lowered position after the rock or other obstruction has been passed.

Having thus described the invention, what is claimed is:

In a releasable tractor hitch for attaching farm implements and the like to tractors, a first bar extending from the tractor, a second bar having a substantially straight leg carrying a weight at the end thereof, and a pin pivotally mounting the said second bar on the outer end of said first bar, said straight leg normally extending downwardly from said pin, the end of said second bar on the opposite side of the pin from the end forming the weight carrying leg curved to form a socket and having a portion extending from the socket on a gradually enlarging radius with respect to said pin whereby force exerted by a cable held by the socket in performing work is counteracted by the weight and a force resulting from a sudden pull on the cable overcomes the force of gravity on the weight, elevating the weight, and actuating the said second bar to move the end forming the socket to such a position that a cable held thereby is released.

ALBERT F. SHANER.

REFERENCES CITED

The following references are of record in the file of this patent:

UNITED STATES PATENTS

| Number | Name | Date |
|---|---|---|
| 73,193 | Overholtzer | Jan. 7, 1868 |
| 558,006 | Vannote | Apr. 7, 1896 |
| 1,362,905 | Vanderdonck | Dec. 21, 1920 |